Figures 1, 2:
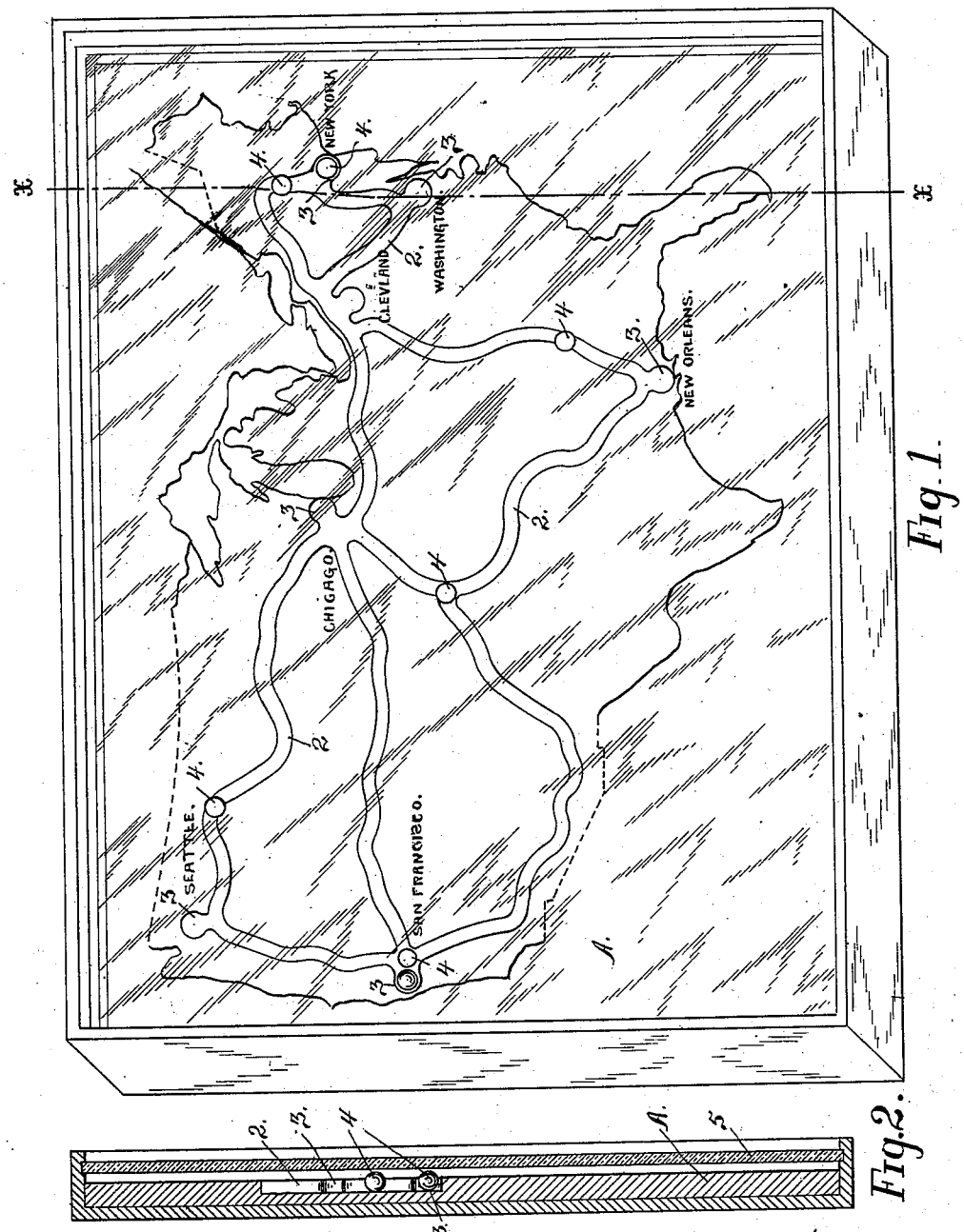

No. 723,498. PATENTED MAR. 24, 1903.
L. A. SVENSON.
PUZZLE.
APPLICATION FILED FEB. 6, 1902.
NO MODEL.

Witnesses,

Inventor,
Leonard A. Svenson
By Dewey Strong & Co.
Attys

ER
UNITED STATES PATENT OFFICE.

LEONARD A. SVENSON, OF OAKLAND, CALIFORNIA.

PUZZLE.

SPECIFICATION forming part of Letters Patent No. 723,498, dated March 24, 1903.

Application filed February 6, 1902. Serial No. 92,810. (No model.)

*To all whom it may concern:*

Be it known that I, LEONARD A. SVENSON, a citizen of the United States, residing in Oakland, county of Alameda, State of California, have invented an Improvement in Puzzles; and I hereby declare the following to be a full, clear, and exact description of the same.

My invention relates to improvements in railroad and geographical puzzles. Its object is to provide an ingenious and simple toy which will afford both entertainment and instruction.

It consists, essentially, of a surface upon which is depicted a map of a State or country, pockets or recesses thereon representing cities of that particular country, each city represented by a different color, intersecting grooves representing railroads connecting the cities, and balls representing trains traveling in these grooves, each ball corresponding in color to a particular city, the object being to get the balls into the relatively colored pockets.

Having reference to the accompanying drawings, Figure 1 is a perspective view of my invention. Fig. 2 is a sectional view taken on the line $x\ x$ of Fig. 1.

A represents a base or support of any suitable material, on which is depicted a map of a State or country. In the present instance I have shown a map of the United States. Into this surface a series of grooves 2 are cut, corresponding to the various trunk lines or railroad systems. At suitable points corresponding to well-known cities or railroad centers are disposed pockets or lateral recesses 3. In the present instance I have shown the cities of Washington, New York, Cleveland, Chicago, New Orleans, Seattle, and San Francisco. Each of these cities is differently colored—as, for example, Washington would be white, New York red, Cleveland blue, &c. A set of balls 4, corresponding in number to the cities and each ball relatively colored to identify it with a particular city, is placed in the grooves, and these balls are adapted to roll freely in either direction along the grooves. The pockets 3 are so disposed that a ball may freely run into them from a groove and out again into the groove, but when lodged in a pocket or station another ball may freely pass by that station to its destination.

If desired, the base may be suitably inclosed or covered by a glass 5, which will prevent the balls falling out of the grooves or pockets and so interfere with the proper manipulation of the puzzle.

The operation is as follows: The balls having been placed in the grooves and inclosed, as stated, without relation to color or position, the puzzle is to get the various balls into the pockets with which the balls respectively correspond in color—that is, to get the white ball into the Washington pocket, the red ball into the pocket designated New York, the blue ball into the pocket marked and geographically corresponding to Cleveland, and so on. This is done by gently tipping the board from side to side and when a ball or "train" has finally reached its destination endeavoring to keep it there until all the other trains have reached their several terminii. The number of the intersecting lines and the crookedness of these lines add to the amusement, while calling for greater perseverance, patience, and skill on the part of the operator.

Of course it is understood that I do not limit myself to a map of the United States or to the cities or railroads as shown, for it is obvious that a map of any portion of the globe may be used and the cities or termini and lines of travel may be varied accordingly.

By "grooves" and "pockets" I mean any form of a channel or runway and receptacles adaptable for the purposes herein specified.

Having thus described my invention, what I claim, and desire to secure by Letters Patent, is—

An improved puzzle consisting of an inclosing frame having a base and a transparent cover, said base having a map delineated thereon so as to be exposed through the cover, and having channels made in its surface in irregular lines and representing lines of travel;

pockets formed at intersecting points of the channels and representing, and designated as, geographical centers; differently-colored balls reciprocable in the channels and of such size that they will seat in the pockets, the number of said balls corresponding to the number of pockets and one ball designed for each pocket, and each of said pockets being colored to correspond with a particular ball, as herein set forth.

In witness whereof I have hereunto set my hand.

LEONARD A. SVENSON.

Witnesses:
JOSEPH SVENSON,
PETER A. SVENSON.